United States Patent [19]

Quick, Jr. et al.

[11] 4,413,258

[45] Nov. 1, 1983

[54] INTERCONNECTION FOR LOCAL AREA CONTENTION NETWORKS

[75] Inventors: Roy F. Quick, Jr.; John E. Spracklen, both of San Diego, Calif.

[73] Assignee: Burroughs Corporation, Detroit, Mich.

[21] Appl. No.: 330,714

[22] Filed: Dec. 14, 1981

[51] Int. Cl.³ .............................. H04J 3/02; H04Q 9/00
[52] U.S. Cl. .................................... 340/825.5; 370/94
[58] Field of Search ........................ 340/825.5, 825.54; 370/96, 94, 92, 90, 88; 178/3

[56] References Cited

U.S. PATENT DOCUMENTS 4,259,663 3/1981 Gable ............................... 340/825.5
4,284,976 8/1981 Gable et al. ............................ 178/3
4,360,912 11/1982 Metz et al. ....................... 340/825.54

Primary Examiner—Donald J. Yusko
Attorney, Agent, or Firm—J. Ronald Richbourg; Mervyn L. Young; Kevin R. Peterson

[57] ABSTRACT

An interconnection circuitry for two local area contention networks which is adapted to jam the respective networks when stations on both sides of the interconnection circuitry attempt transmission. If stations on opposite sides of the interconnect circuitry begin transmitting at the same time, the interconnect circuitry operates to place a high signal on the channel of each network and all stations will detect that the data is garbled and discard it.

10 Claims, 7 Drawing Figures

INTERCONNECTION FOR LOCAL AREA CONTENTION NETWORKS

BACKGROUND OF THE INVENTION

1. Field of the Invention

This invention relates to an interconnection circuit for a network of data stations and more particularly to such an interconnection circuit for a network wherein control of the transmission between stations is shared by the respective stations.

2. Description of the Prior Art

Prior art networks not having a master controller have employed "contention" schemes whereby each node of the network contends for the transmission medium whenever it is ready to transmit. One of the earliest contention networks was the "Aloha" system built by the University of Hawaii. In this system, each node transmitted whenever it had a packet ready for transmission. Whenever a portion of one node's transmission overlapped with another node's transmission, that overlap destroyed both packets. If the sending node did not receive an acknowledgment within another packet from the destination node after an arbitrary time period, it would assume that a collision had occurred and retransmit. In order to avoid continuously repeated collisions, some method of introducing a random retransmission delay had to be introduced.

An attempt at reducing the effect of collision in contention-type networks is disclosed in the Metcalfe et al U.S. Pat. No. 4,063,220 which is directed toward a communication network in which each node is capable of detecting when collision occurs on the channel during that node's transmission, and interrupts its transmission when such a collision occurs. A random number generator is employed to select an interval of time to delay before the next attempt at transmission. However, the collision detection mechanism adds to the complexity of the respective nodes with an increase in the cost of the system.

An improvement in the avoidance of collision problems is disclosed in U.S. Pat. No. 4,332,027 entitled Local Area Contention Network Data Communication System, and assigned to the assignee of the present invention. That application discloses a network employing a plurality of stations where each station is adapted to operate in a cyclic mode for contending for access to the network channel along with other stations of the network. The three states of the cycle are the Idle state, the Packet-Being-Transmitted state, and the Acknowledgment Period state. Each station will not begin transmission until it determines that the channel is in an Idle state. Once the station has determined that the channel is idle, it will then delay for a period of time that is randomly chosen and, if the channel is still idle, will then begin transmission. Following transmission, the channel will again be quiescent for a short period of time before the acknowledgment signal is transmitted from the receiver. Each packet of data to be transmitted is of fixed length so as to provide for the synchronization between the various stations contending for access to the channel.

The collision problem still arises when two separate networks are interconnected for expansion of the system. A particular problem arises in such interconnection when a station on one network is attempting to access the combined network while a station on the other network is also attempting to access the combined network. For the Metcalfe et al type system, a repeater is provided which returns the respective transmissions to their senders creating collisions on each channel which the respective senders detect and stop transmission. Such a repeater is disclosed in the Boggs et al U.S. Pat. No. 4,099,024. However, the repeater of Boggs et al is not adapted to handle transmissions from stations on opposite sides, which stations are not adapted to detect collisions and stop transmission.

It is, then, an object of the present invention to provide improved interconnection circuitry for two local area contention networks.

It is another object of the present invention to provide an improved interconnection circuitry for two local area contention networks, the stations of which are not adapted to cease transmission after detecting a collision on the combined network with transmissions from a competing station.

It is still a further object of the present invention to provide an improved interconnection circuitry for two local area contention networks, which circuitry jams competing transmissions from opposite sides of the interconnect circuitry.

SUMMARY OF THE INVENTION

In order to accomplish the above objects, the present invention is directed toward an interconnect circuitry for two local area contention networks, the stations of which are adapted to operate in a cyclic mode for contending for access to the network channel. Each station will not begin transmission until it determines that the channel is in an idle state. Once the station has determined that the channel is idle, it will then delay for a period of time that is randomly chosen and, if the channel is still idle, will then begin transmission. The interconnect circuitry is adapted to receive transmissions from one network and transfer them to the second network. If stations on opposite sides of the interconnect circuitry begin transmitting at the same time, the interconnect circuitry operates to place a high signal on the channel of each network and all stations will detect that the data is garbled and discard it. Since the channels are not adapted to detect collisions between competing transmissions, if two stations on one side of the interconnect circuitry begin transmission at the same time, the garbled combined transmission will be translated through the interconnect circuitry to the second channel and either no receiving station will recognize its address, or if it does, will recognize that the data is garbled and will discard it.

It is, then, a feature of the present invention to provide an interconnect circuitry for two local area contention networks which circuitry will pass data packets, even garbled data packets from one network to the other network, but will jam both networks should it receive transmissions from stations on opposite sides.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
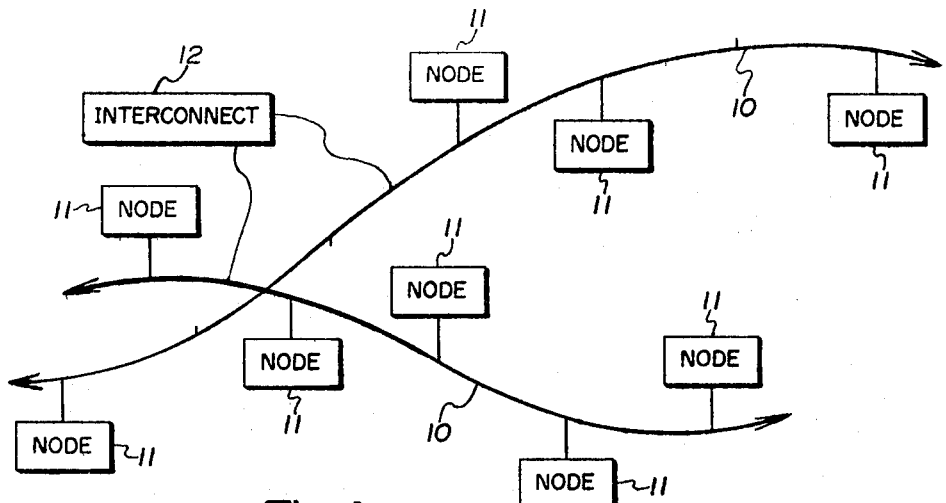
FIG. 1 is the schematic diagram of two local area contention networks interconnected by the present invention.

The present invention is directed toward an interconnection between two contention networks. Such networks connect stations into individual networks which are interconnected by the present invention to expand the network. The networks use a shared communication channel and a distributed control. There is no central arbitrator of the channel utilization. The shared communication medium can be a twisted pair, a coaxial cable, fiberoptics, and so forth, as illustrated in FIG. 1.

Figure 2:
FIG. 2 is a diagram of an information packet employed in the present invention.

The data structure employed is illustrated in FIG. 2 and is a fixed-size packet which contains a fixed number of data bits along with the information necessary for interface synchronization, message routing and error detection. As illustrated in FIG. 2, the first field of the packet is the SYNC code which is a four-bit field that indicates that information follows and serves to synchronize the receiving node or station for reception of the information packet which follows. The second field is the Destination Address code which is 16 bits long and designates the stations for which the message is destined. The Data Field consists of 132 eight-bit bytes. The last field is the Cyclic Redundancy Check (CRC) which contains a 16-bit error detection code. A new CRC code is generated by the station during packet reception and is checked against the transmitted CRC code. Other means of error detection are also employed.

As was indicated above, the present invention is directed toward an interconnection of two or more contention networks. That is to say, each station of the respective networks transmits packets independently of the other stations, possibly interfering or colliding with other transmissions. If the transmitted packet is received correctly by the destination station, then the receiver responds with an acknowledgment signal. If the acknowledgment signal is not received by the transmitting station during the acknowledgment period immediately following the packet transmission, then the transmitter assumes that the transmission was unsuccessful.

Figure 3A:
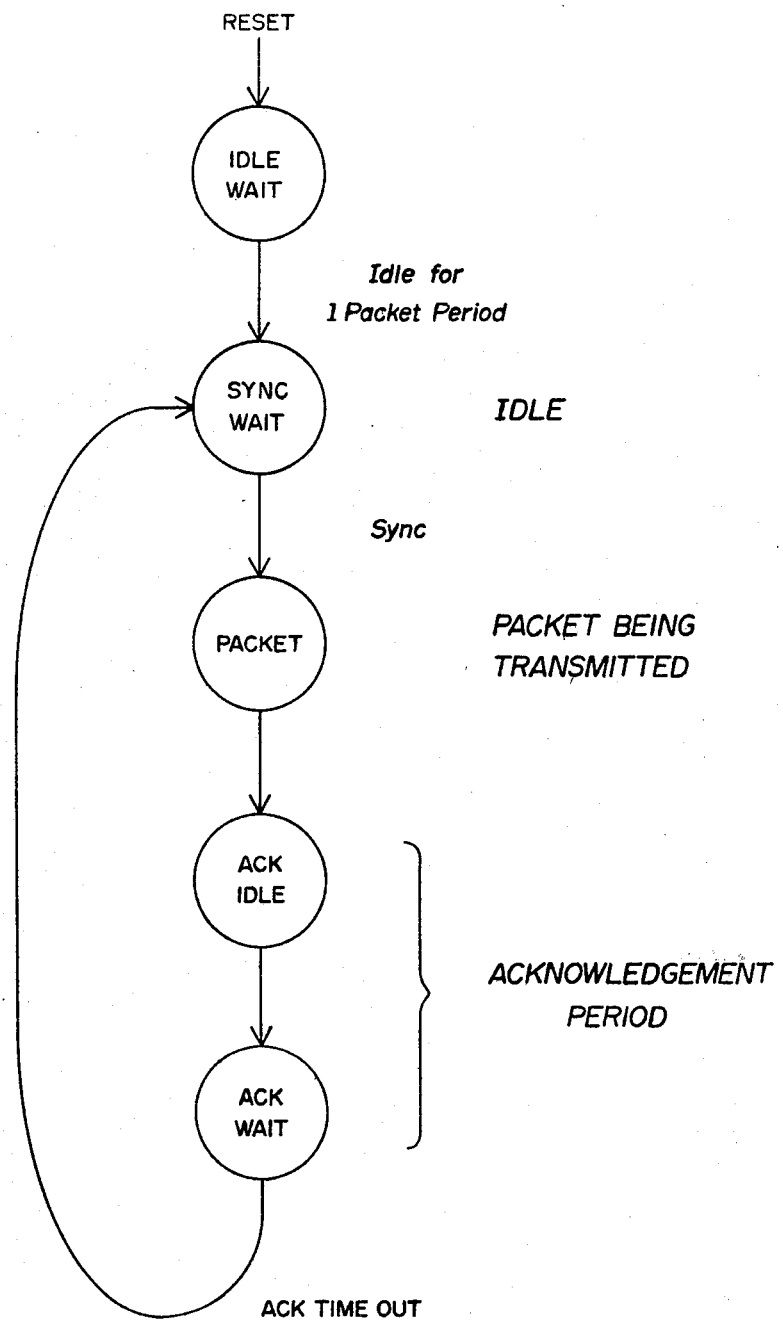
FIGS. 3A and 3B are flow charts illustrating respectively the channel state machine and the transmission method of networks employing the present invention.

The channel state machine for each station in the networks employing the present invention is illustrated in FIG. 3A. As indicated therein, the network channel cycles sequentially through three states: Idle, Packet-Being-Transmitted, and Acknowledgment. Each station continually monitors the channel and keeps track of its state. Because there is a propagation delay for this signal, the exact times of transmission between the states vary from point to point along the network but they are all synchronized within a fixed time interval.

Figure 3B:
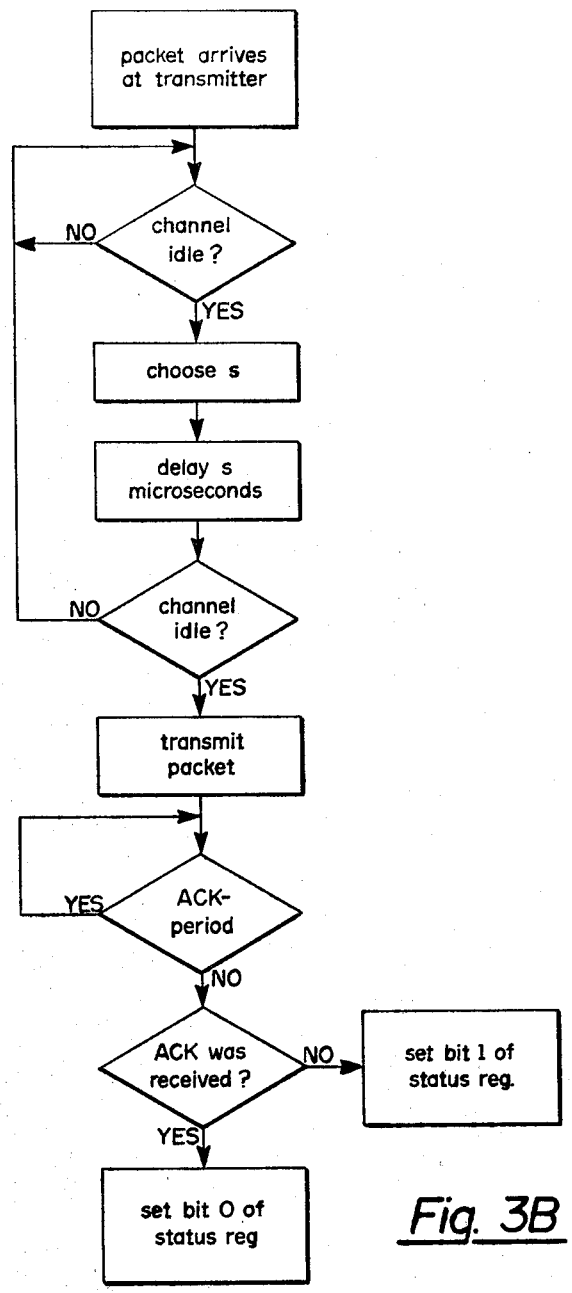

When a packet to be transmitted is loaded into the interface of a particular station, that interface operates in a manner that will now be described in relation to FIG. 3B.

Step 1. Upon arrival of a packet to be transmitted, the interface checks to see if the channel is idle. If the channel is either in the Packet-Being-Transmitted state or the Acknowledgment state, then the transmitter waits until the channel becomes idle.

Step 2. An integer s is chosen randomly in the interval [O,S] with each of the S+1 possible choices being equally probable. The transmitter then delays for s microseconds. If the channel is still idle at the end of the delay, then the packet is transmitted. If at that time the channel is not idle, then the transmitter goes back to Step 1.

Step 3. The transmitter waits for the acknowledgment period to complete. It then sets the interface status register according to whether or not an acknowledgment signal was received during the acknowledgment period. The setting of the status register causes an interrupt request of the resident computer of the station.

An important parameter is the propagation delay time t from one end of a network to the other, which is used to determine the duration of the acknowledgment period. For a 5,000-foot cable medium, propagation delay time t is approximately eight microseconds. When the transmitter and the receiver are at opposite ends of the network, the last bit transmitted requires t microseconds to arrive at the receiver. The receiver then delays for a period of 2t before transmitting the acknowledgment signal. The acknowledgment signal takes another t microseconds to arrive at the transmitter node. After transmitting the acknowledgment signal, the receiver sets its interface status register to indicate a packet has been received. The setting of the status register causes an interrupt request of the resident computer. A more detailed description of the respective stations, their interface and their registers, is described in the above referred-to Malcolm et al application.

With a network of stations as described above, the PACKET state of the channel state machine for each station will always be of fixed duration, namely the packet transmission time. The receiver will wait for a time 2t before replying with the acknowledgment signal and then another time 2t for the idle state to begin. If the receiver detects any activity on the channel during the first waiting period, at the end of the packet-being-transmitted state, it will not send an acknowledgment signal. If the transmitter detects any channel activity during the first waiting period following the transmission of a packet, it will ignore any acknowledgment signal on the channel during the following acknowledgment wait state.

With the conditions described above, it can be demonstrated that the channel state machine of each station in the network will be synchronized within a time t of all other station channel state machines, and that the transmitting station will receive a valid acknowledgment signal only if the intended receiver has correctly received the packet.

Referring to FIG. 1, two contention networks are illustrated as being interconnected by the present invention. Each network includes a channel 10 as was described above, with a plurality of stations or nodes 11 coupled to their respective channels for communications. Interconnection means 12 of FIG. 2 is illustrated in a simplified schematic form in FIG. 4.

Figure 4:
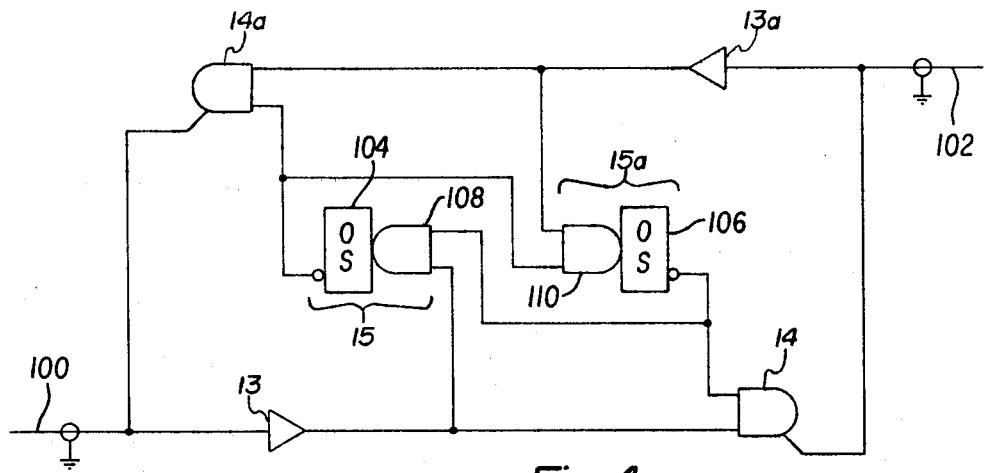
FIG. 4 is a simplified schematic diagram illustrating the interconnect circuitry of the present invention.

FIG. 4 shows the basic concept of the interconnection means of the present invention which is, in essence, a repeater to receive signals from one channel including a coaxial cable 100 and transfer them to the other channel including a coaxial cable 102. It is to be noted that both channels may have the same or different voltage levels. Incoming signals may arise on either side of the repeater. When a signal arrives from one side, it is necessary to drive the other channel with the same waveform to allow reception of the signal on either side of the repeater. An arbiter is needed to prevent latchup. That is to say, a signal arriving from one channel would drive the other channel, which must then be prevented from activating the driver which transmits on the first channel.

The classical asynchronous arbiter problem has received considerable study because of its behavior under ambiguous input conditions. Some simple arbiter circuits are prone to metastability, which makes it uncertain that the arbiter can resolve conflicts within any given time constraint.

The present invention is directed toward circuitry that does not have metastability problems. This is possible with the present invention since, because of the nature of the respective networks as described above, conflict resolution is not required. Conflicts occur only during collisions, so the repeater needs only to insure that the collision is sensed on all parts of the respective channels and this is accomplished by placing a high signal on both channels which causes the stations on both sides of the interconnection means to reject the packet transmission as will be more thoroughly described below.

DETAILED DESCRIPTION OF THE INVENTION

In FIG. 4, the arbiter is formed of two one-shot multivibrators 15 and 15a which are employed to serve as a latch, and this solves the problem of an input signal being transmitted on the cable 100 through the input gate 13 and through the arbiter to output AND gate 14a before that input signal can be transmitted by output AND gate 14. The two one-shot multivibrators 15 and 15a are used to extend the low time of the latch long enough to allow for the delay through the driver and the receiver. Each of the one-shot multivibrators 15 and 15a include a one-shot circuit 104 and 106, and AND gates 108 and 110 coupled to input terminals of these one-shot circuits, respectively. The one-shot circuit 104 and 106 are required to be level-triggered and retriggerable. That is to say, the output is low whenever the input is low and goes high at some fixed delay after the last time the input went high.

Figure 5:
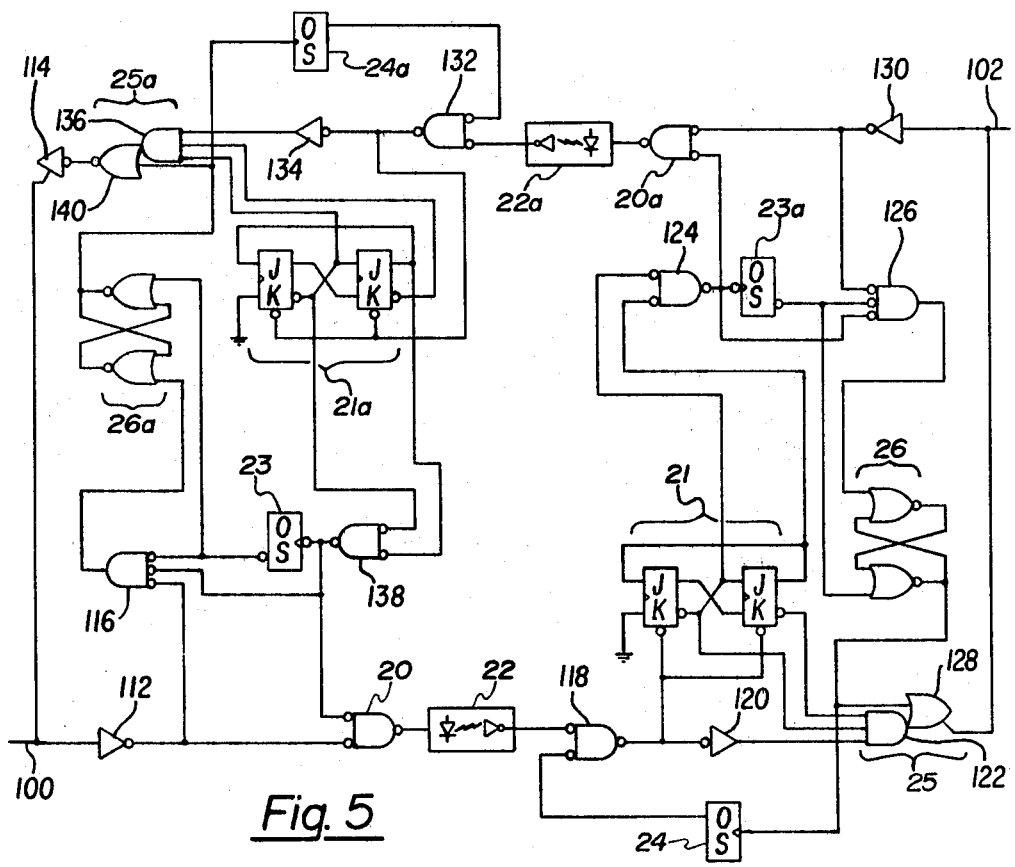
FIG. 5 is a detailed schematic diagram illustrating the interconnect circuitry of the present invention.

With reference now to FIG. 5 a detailed schematic diagram illustrating the interconnect circuitry of the present invention is shown. The extension of the low time of the arbiter latch is achieved by employment of two pairs of JK flip-flops to form gray-code counters 21 and 21a which are held in the reset state while the inputs to the circuitry are low. When either input is high, the corresponding output does not go high until the final state of the gray-code counter is reached. Since the inputs are asynchronous relative to a clock, the delay can range from two to three clock times plus the gate delay through the respective output AND-NOR gate structure 25 and AND-OR gate structure 25a. The clock is chosen so that two clock periods exceed the delay through the driver-receiver pairs.

In order to provide isolation between the two channels, optical isolators 22 and 22a are provided for optical transmission of the respective signals, thereby isolating the two halves of the interconnection circuitry to prevent interference or noise from affecting the signals being translated and also to allow for the respective channels to operate at different voltage levels.

The cable 100 is coupled to the input terminal of an inverter 112 and to the open emitter output terminal of an inverter 114. The output of the inverter 112 is coupled to one of three inverting inputs of an AND gate 116 and to an inverting input of the NAND gate 20. The output of the NAND gate 20 is coupled to an input of the optical coupler 22 and the output of this coupler is coupled to one of two inverting inputs of a NAND gate 118. The output of the NAND gate 118 is coupled to the reset input terminals of the JK flip-flops of the gray counter 21 and to the input of an inverter 120. The output of the inverter 120 is coupled to one of three inputs to an AND gate 122 of the AND-OR gate structure 25. The output terminal of the structure 25, which is an open emitter driver, is coupled to the cable 102.

The output terminals of the JK flip-flops and their gray counter 21 are coupled to the remaining two input terminals of the AND gate 122. The true output terminals of the JK flip-flops of the gray counter 21 are coupled, respectively, to inverting input terminals of a NAND gate 124 having an output thereof coupled to the input of the one-shot 23a, to one of two inverting input terminals of the NAND gate 20a, and to one of three inverting input terminals of an AND gate 126. The output terminal of the one-shot 23a is coupled to a second inverting input terminal of the NAND gate 126 and to a first input terminal of the latch 26. The output terminal of the AND gate 126 is coupled to the second input terminal of the latch 26. The output terminal of this latch is coupled to one of two input terminals of an OR gate 128 in the structure 25, and the output terminal of the AND gate 122 is coupled to the second input terminal of the OR gate 128.

In a similar manner, the cable 102 is coupled to the input terminal of an inverter 130 and to the open emitter output terminal of the OR gate 128. The output terminal of the inverter 130 is coupled to the third inverting input terminal of the AND gate 126 and to one of two inverting input terminals of the NAND gate 20a. The output terminal of the NAND gate 20a is coupled to the optical coupler 22a and the output terminal thereof is coupled to one of two inverting input terminals of a NAND gate 132. The output terminal of the NAND gate 132 is coupled to the clock input terminals of the JK flip-flops forming the gray counter 21a, and to the input terminal of an inverter 134. The output terminal of the inverter 134 is coupled to one of three input terminals of an AND gate 136 in the structure 25a.

The not true output terminals of the JK flip-flops in the gray counter 21a are coupled to the second and third, respective, input terminals of the AND gate 136. The true output terminals of the JK flip-flops in the counter 21a are coupled to two inverting input terminals of a NAND gate 138. The output terminal of the NAND gate 138 is coupled to the input terminal of the one-shot 23, to the second inverting input terminal of the NAND gate 20, and to a second inverting input terminal of the AND gate 116. The output terminal of the one-shot 23 is coupled to the third inverting input terminal of the AND gate 116 and to one of two input terminals of the latch 26a. The output terminal of the AND gate 116 is coupled to the second input terminal of the latch 26a.

The output terminal of the latch 26a is coupled to a second input terminal of a NOR gate 140 in the gate structure 25a, and to the input terminal of a one-shot 24a. The output terminal of the one-shot 24a is coupled to the second inverting input terminal of the NAND gate 132.

The manner in which the respective halves of the circuitry detect collisions or attempts to transmit by both channels will now be described as well as the manner in which the circuitry forces errors by jamming both lines at a high signal level. This detection circuitry description will be for the channel coming in from the left, and it will be understood that the corresponding circuitry for the channel coming in from the right will operate in a similar fashion. When an incoming signal from the channel on the right (cable 102) goes low, the arbiter one-shot or counter 21a begins a time-out period. During this time-out period, the interconnection circuitry is allowed to reverse direction of transmission. At the same time, one-shot circuit 23 is triggered and has a period of three microseconds. If a signal is received from the lefthand channel (cable 100), the NOR gate latch 26a produces a collision signal for the remainder of the three microsecond period. This collision signal is used to activate the driver, and jams, thereby forcing the reception of erroneous data or a high signal.

Three microseconds are provided because it could take one bit time to see the need to turn the direction around, after which the line would be driven high for one microsecond, so an additional microsecond of jam time is used to insure that a high will be seen during an interval which should be low.

A second one-shot circuit 24a is triggered by the jam signal for six microseconds. This signal is used to inhibit signals from the righthand channel so that all of the arbiter and the jam one-shot circuits will reach their initial states after the jam period ends. This prevents the jam signal from re-firing itself and it insures that jams occurring at the end of the packet transmission cannot extend the packet length for more than three microseconds.

Figure 6:
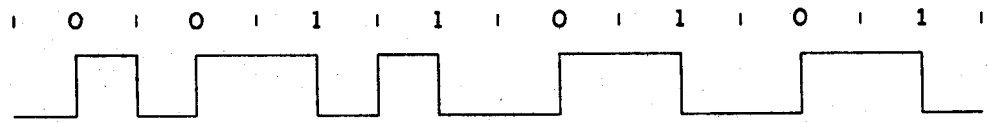
FIG. 6 is a representation of signals in Manchester code as employed by the networks which employ the present invention.

The reason that jamming each channel or placing a high signal on each channel will signal the transmitting stations that a collision has occurred is that code is transmitted in Manchester code form. Such Manchester encoding is employed to send data with an imbedded clock and no DC bias. It is characterized by always having a transition during the middle of a bit interval as illustrated in FIG. 6. A logic zero is a positive going transition while a logic one is a negative going transition. Since each station is always monitoring its corresponding channel, and it does not detect such transitions during the time that the channel has been jammed with a high signal, it will reject all data as erroneous during that packet transmission period.

EPILOGUE

An interconnection circuitry for two local area contention networks has been described which is adapted to jam the respective networks when stations on both sides of the interconnection circuitry attempt transmission. Since the interconnection circuitry is provided with optical isolators, the two networks can operate at different voltage levels. The respective networks themselves are adapted to detect collisions between competing transmissions, but not to stop transmission. Therefore, if two stations on one side of the interconnect circuitry begin transmission at the same time, the garbled combined transmission will be translated through the interconnect circuitry to the second channel and either no receiving station will recognize its address, or if it does, will recognize that the data is garbled and will discard it.

While but one embodiment of the present invention has been disclosed, it will be understood by those skilled in the art that variations and modifications may be made therein without departing from the spirit and scope of the invention as claimed.

What is claimed is:

1. In a system of local area contention networks including a plurality of channels, each channel having a plurality of stations coupled thereto for transmission thereon, and an interconnection means for connecting said plurality of channels, each station being adapted to sense its corresponding channel for activity when it is ready to transmit, wait a random period of time and, then, begin transmission if there is still no activity on said channel, said interconnection means comprising:
   a pair of output drivers each coupled to one of said channels;
   a pair of input receivers each coupled to one of said channels;
   latch means to set the input receiver from one of said channels for transmission to the output driver for the other of said channels for transmission from said one channel to said other of said channels; and
   detection means to detect when transmission is received from the other of said channels while transmission is being received from said one of said channels and to cause each of said output drivers to place a jamming signal on the respective channels to block transmission.

2. An interconnection means according to claim 1 wherein:
   said latch means is adapted to provide a time-out period when transmission has been received from one of said channels to allow the interconnection circuitry to reverse direction of transmission.

3. An interconnection means according to claim 2 wherein:
   said latch means includes two pairs of JK flip-flops to form gray-code counters.

4. An interconnection means according to claim 3 further including:
   a pair of transmission gates each coupled between the input receiver from one of said channels and the output driver to the other of said channels respectively, said transmission gates being coupled to said latch means to block reception of transmission from one channel when transmission is being received from said other channel.

5. In a system of local area contention networks including a plurality of channels, each channel having a plurality of stations coupled thereto for transmission thereon, and an interconnection means for connecting said plurality of channels, said interconnection means comprising:
   a pair of output drivers each coupled to one of said channels;
   a pair of input receivers each coupled to one of said channels;
   latch means to set the input receiver from one of said channels for transmission to the output driver for the other of said channels for transmission from said one channel to the said other of said channels; and
   detection means to detect when transmission is received from the other of said channels while transmission is being received from said one of said channels and to cause each of said output drivers to place a jamming signal on the respective channels to block transmission.

6. An interconnection means according to claim 5 wherein:
said latch means is adapted to provide a time-out period when transmission has been received from one of said channels to allow the interconnection circuitry to reverse direction of transmission.

7. An interconnection means according to claim 5 wherein:
said latch means includes two pairs of JK flip-flops to form gray-code counters.

8. An interconnection means according to claim 7 further including:
a pair of transmission gates each coupled between the input receiver from one of said channels and the output driver to the other of said channels respectively, said transmission gates being coupled to said latch means to block reception of transmission from one channel when transmission is being received from said other channel.

9. An interconnection means according to claim 8 further including:
a pair of one-shot multivibrators, each coupled between said detection means and one of said output drivers to prevent said output driver from transmitting a new jam signal immediately after transmitting a previous jam signal.

10. An interconnection means according to claim 8 further including:
a pair of optical isolators respectively coupled between the transmission gate from one channel and the output driver to the other channel to provide optical isolation between said channels which may operate at different voltage levels.

* * * * *